(12) United States Patent
Chang

(10) Patent No.: US 7,210,386 B1
(45) Date of Patent: May 1, 2007

(54) QUICKLY DETACHABLE PROTECTIVE COVER UNIT OF A TABLE SAWING MACHINE

(75) Inventor: Richard Chang, Fang Yuan (TW)

(73) Assignee: Kingsand Machinery Ltd., Taichung Hsien (TW)

( * ) Notice: Subject to any disclaimer, the term of this patent is extended or adjusted under 35 U.S.C. 154(b) by 0 days.

(21) Appl. No.: 11/263,895

(22) Filed: Nov. 2, 2005

(51) Int. Cl.
*B27B 27/04* (2006.01)

(52) U.S. Cl. ............... 83/477.2; 83/478; 83/102.1; 83/DIG. 1

(58) Field of Classification Search ............... 83/102.1, 83/478, 477.2, 860, 481, DIG. 1, 440.2, 954; D15/133; 451/451, 452, 455; 144/251.1, 144/251.3

See application file for complete search history.

(56) References Cited

U.S. PATENT DOCUMENTS

| | | | | |
|---|---|---|---|---|
| 2,352,235 A * | 6/1944 | Tautz | ................... | 83/102.1 |
| 2,572,326 A * | 10/1951 | Evans | ................... | 83/102.1 |
| 2,593,596 A * | 4/1952 | Olson | ................... | 83/102.1 |
| 2,731,049 A * | 1/1956 | Akin | ................... | 83/478 |
| 4,418,597 A * | 12/1983 | Krusemark et al. | ........ | 83/478 |
| 4,625,604 A * | 12/1986 | Handler et al. | ........ | 83/102.1 |
| 5,159,864 A * | 11/1992 | Wedemeyer et al. | ........ | 83/13 |
| 5,231,906 A * | 8/1993 | Kogej | ................... | 83/478 |
| 5,619,896 A * | 4/1997 | Chen | ................... | 83/477.2 |
| D425,529 S * | 5/2000 | Svetlik | ................... | D15/133 |
| 6,076,445 A * | 6/2000 | Kenyon et al. | ........ | 83/477.2 |
| 6,109,157 A * | 8/2000 | Talesky | ................... | 83/666 |
| D458,281 S * | 6/2002 | Ceroll et al. | ........ | D15/133 |
| 6,405,624 B2 * | 6/2002 | Sutton | ................... | 83/102.1 |
| 6,418,829 B1 * | 7/2002 | Pilchowski | ........ | 83/397 |
| 6,578,460 B2 * | 6/2003 | Sartori | ................... | 83/100 |
| 6,736,042 B2 * | 5/2004 | Behne et al. | ........ | 83/440.2 |
| 6,840,144 B2 * | 1/2005 | Huang | ................... | 83/102.1 |
| 6,942,229 B2 * | 9/2005 | Brazell et al. | ........ | 280/30 |
| 2001/0035081 A1 * | 11/2001 | Sutton | ................... | 83/102.1 |
| 2004/0187666 A1 * | 9/2004 | Huang | ................... | 83/477.2 |
| 2004/0255745 A1 * | 12/2004 | Peot et al. | ........ | 83/102.1 |
| 2005/0092149 A1 * | 5/2005 | Hartmann | ........ | 83/58 |
| 2005/0211034 A1 * | 9/2005 | Sasaki et al. | ........ | 83/102.1 |
| 2005/0211039 A1 * | 9/2005 | Lo et al. | ........ | 83/477.2 |
| 2006/0032355 A1 * | 2/2006 | Wang | ................... | 83/471.1 |
| 2006/0053993 A1 * | 3/2006 | Wong | ................... | 83/478 |
| 2006/0101962 A1 * | 5/2006 | Garcia | ................... | 83/102.1 |

* cited by examiner

*Primary Examiner*—Boyer D. Ashley
*Assistant Examiner*—Laura M. Brean
(74) *Attorney, Agent, or Firm*—Troxell Law Office, PLLC

(57) ABSTRACT

The quickly-detachable protective cover unit of a table sawing machine includes a protective cover, a non-return plate, a protective plate, a combining plate and an extending plate. The extending plate positioned at one side of the saw blade of a table sawing machine has its inner end fixed with a quickly-detachable handle unit for positioning the combining plate thereon. The protective plate is inserted through the saw blade and the combining plate, positioned on the table-sawing machine. The non-return plate and the protective cover are respectively provided with a quickly detachable device to fit in the positioning hole of the combining plate. The components of the quickly detachable protective cover unit are combined by quickly detachable mechanism so they can be disassembled or assembled quickly, needing no tool for carrying out disassembling work.

5 Claims, 8 Drawing Sheets

QUICKLY DETACHABLE PROTECTIVE COVER UNIT OF A TABLE SAWING MACHINE

BACKGROUND OF THE INVENTION

1. Field of the Invention

This invention relates to a quickly detachable protective cover unit of a table-sawing machine, particularly to one able to be assembled and disassembled easily and quickly, needless to employ any tool for carrying out disassembling work.

2. Description of the Prior Art

Generally, a table-sawing machine is provided with a protective cover unit covered around its saw blade for the sake of protection of a user. The conventional protective cover unit of a table sawing machine, as shown in FIG. 1, includes an extending rod 1, a combining plate 2 and a protective cover 3, which are firmly combined together by bolts to prevent them from loosening or falling off.

However, to detach the conventional protective cover unit from the table sawing machine, the locking bolts of the components have to be unscrewed one by one by means of special hand tools, thus wasting much time and resulting in much trouble.

SUMMARY OF THE INVENTION

The objective of the invention is to offer the quickly detachable protective cover unit of a table sawing machine, including an extending plate connected with the saw blade of a table sawing machine. A quickly detachable handle unit is fixed at the inner end of the extending plate for quickly positioning a combining plate that is cut with two positioning notches at preset locations. A protective plate is inserted through the combining plate and then firmly positioned on the worktable of the table-sawing machine. A non-return plate and a protective cover are respectively assembled with the two positioning notches of the combining plate respectively by a quickly detachable device. By so designing, the protective cover unit can be detached from the table sawing machine with convenience and with less time as well, unnecessary to use any tool for carrying out assembling and disassembling work.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
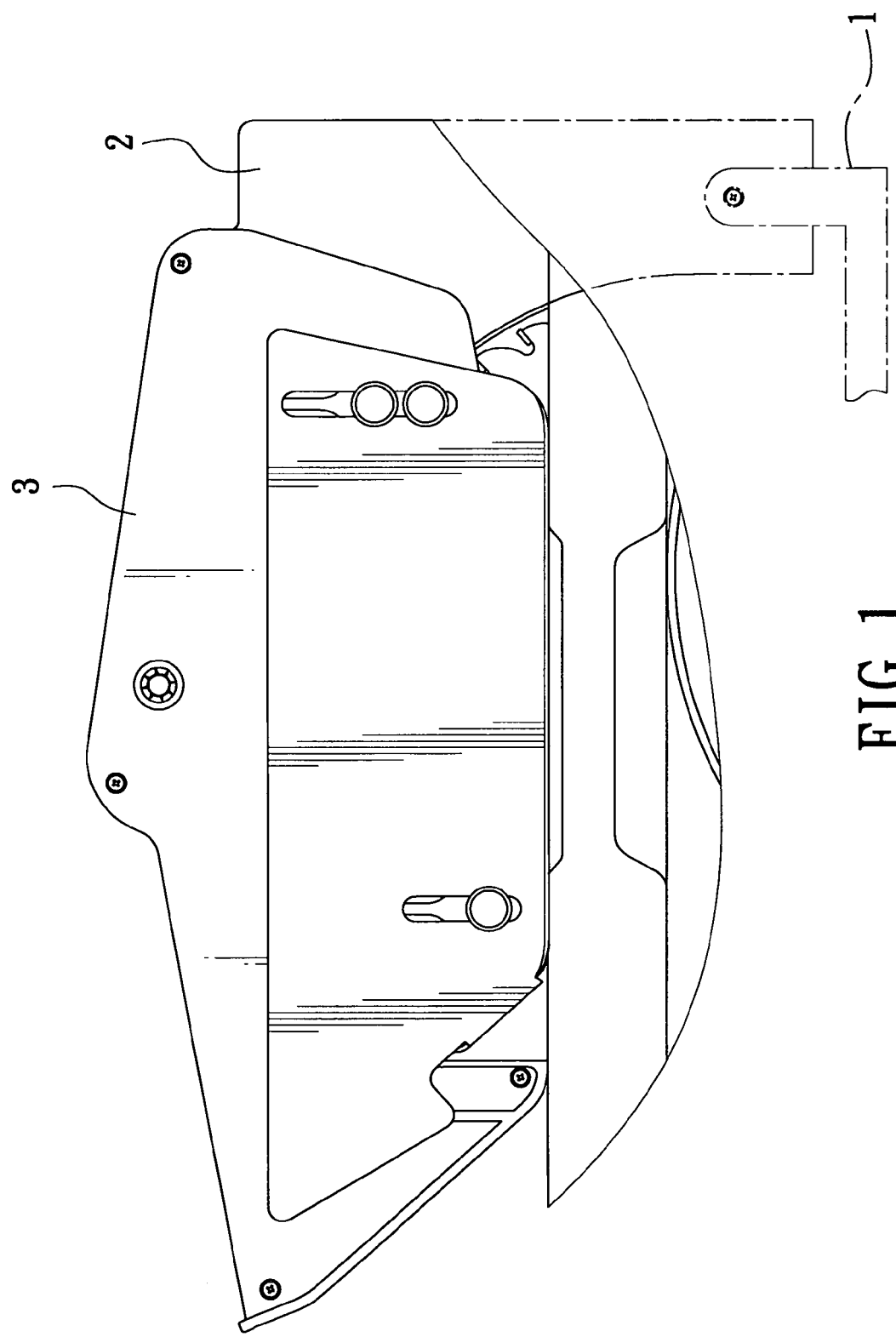
FIG. 1 is a partial side sectional view of the protective cover unit of a conventional table-sawing machine.
Figure 2:
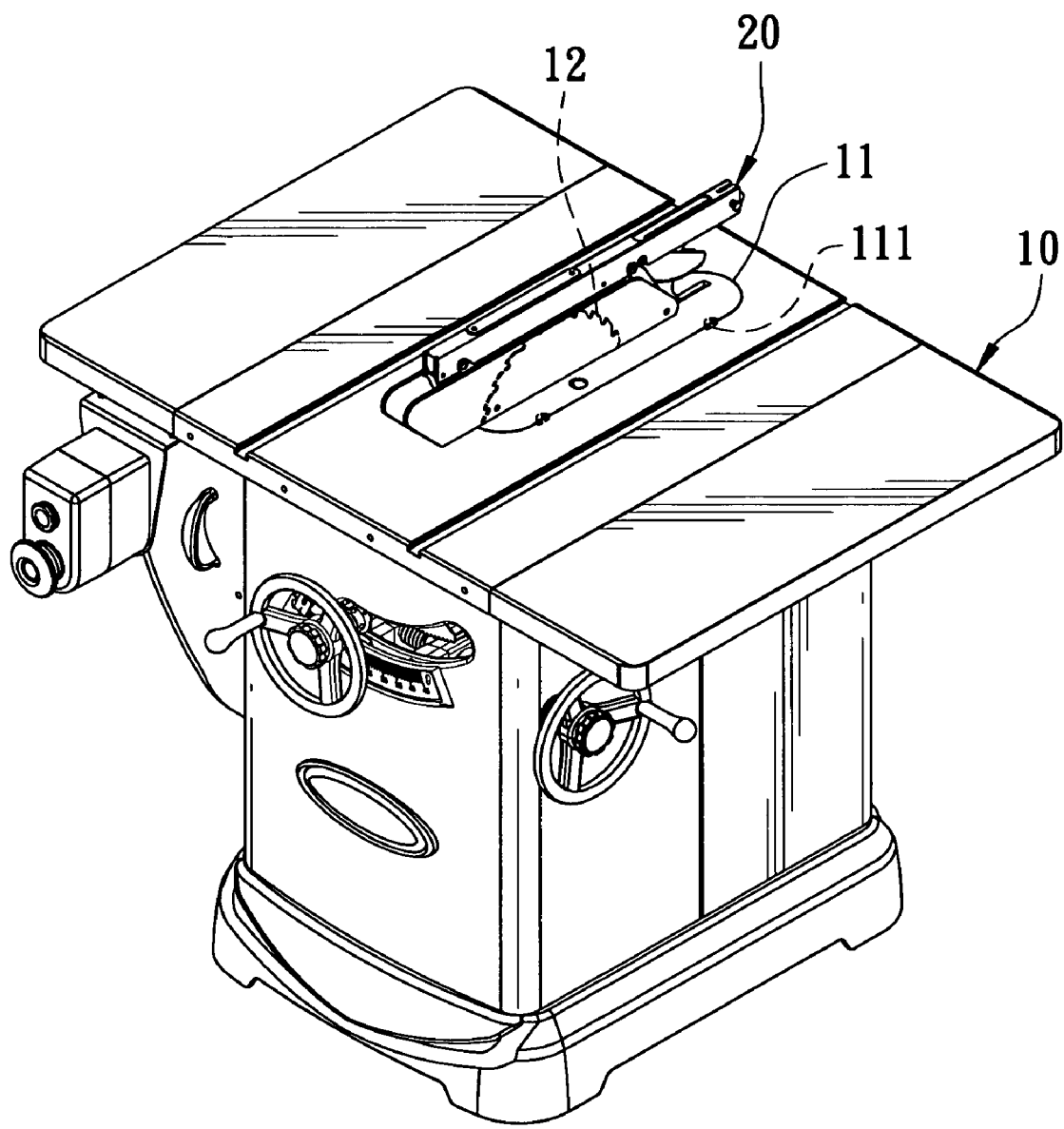
FIG. 2 is a perspective view of a table sawing machine in the present invention.
Figure 3:
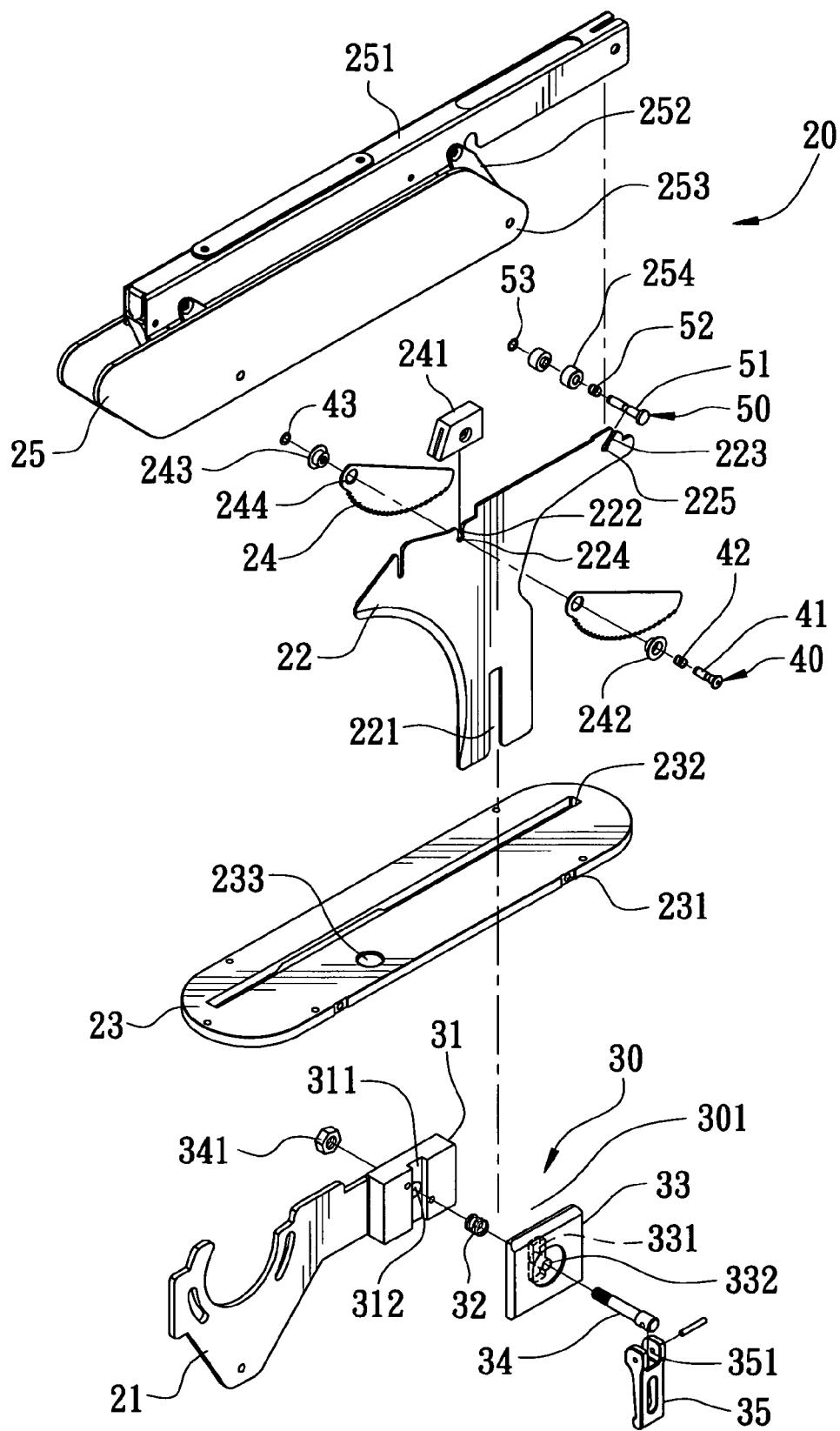
FIG. 3 is an exploded perspective view of the quickly detachable protective cover unit of the table-sawing machine in the present invention.

A preferred embodiment of the quickly detachable protective cover unit of a table-sawing machine in the present invention, as shown in FIGS. 2 and 3, includes a worktable 10 and a quickly detachable protective cover unit 20.

The worktable 10 of the table-sawing machine is formed at a preset location with an oval groove 11 having its lower periphery provided with protruding lugs 111 preset in number. The worktable 10 has a saw blade 12 installed in the interior.

The quickly detachable protective cover unit 20 assembled at the outer side of the saw blade 12 is composed of an extending plate 21, a combining plate 22, a protective plate 23, a non-return plate 24 and a protective cover 25.

The extending plate 21 secured at one side of the saw blade 12 has its inner end fixed with a quickly-detachable handle unit 30 composed of a fixing base 31, an elastic member 32, a position-limiting plate 33 and a quickly detachable pivot 34. The fixing base 31 is fixed on the extending plate 21 and cut with a recessed groove 311 bored with a through receiving slot 312 for receiving the elastic member 32 therein. The position-limiting plate 33 is to be positioned at one side of the fixing base 31, having one side provided with a projecting block 331 to fit in the recessed groove 311 of the fixing base 31, with an insert space 301 adjustably formed in its width between the position-limiting plate 33 and the fixing base 31. Further, the position-limiting plate 33 is bored with a through hole 332 with a comparatively small diameter at a location aligned to the receiving slot 312 of the fixing base 31. The quickly detachable pivot 34 is inserted through both the through hole 332 of the position-limiting plate 33 and the receiving slot 312 of the fixing base 31, and has its front end pivotally connected with a rotary handle 35, which is bored with eccentric holes 351 to be pivotally combined with the quickly detachable pivot 34, and its rear end screwed with a locking nut 341.

The combining plate 22 has its lower end cut with an elongate notch 221 to be fitted on the projecting block 331 of the position-limiting plate 33 of the quickly-detachable handle unit 30 and its upper end cut at preset locations with two positioning notches 222, 223 having their lower ends respectively bored with a positioning hole 224, 225.

The protective plate 23 is an oval plate having the same shape as the oval groove 11 of the worktable 10 and has its peripheral edge pivotally provided with plural elastic positioning projections 231 at preset locations. The protective plate 23 has an elongate slot 232 lengthwise bored in the center for matching with the saw base blade 12 and a round hole 233 bored in one side.

The non-return plate 24 is composed of a fundamental base 241, a front position-limiting member 242, a rear position-limiting member 243 and two ratchet plates 244 respectively having their lower convex edges formed with many small teeth. The two ratchet plates 244 are respectively assembled on opposite sides of the fundamental base 241 by the front and the rear position-limiting member 242, 243. Further, the non-return plate 24 has a quickly detachable device 40 pivotally assembled thereon. The quickly detachable device 40 includes a stepped bolt 41 to be fitted in the positioning notch 222 of the combining plate 22. The stepped bolt 41 has its front end fitted with an elastic member 42 and its rear end fastened on the non-return plate 24 by means of an E-shaped clasp 43.

The protective cover 25 is composed of a basic body 251, two connecting rod units 252 and two protective plates 253. The two connecting rod units 252 are respectively and pivotally positioned at a preset location on the opposite sides of the basic body 251, and the two protective plates 253 are respectively and pivotally combined with an upper end of the two connecting rod units 252 (seen as in FIG. 4). A quickly detachable device 50 is pivotally assembled at the end of basic body 251, including a stepped bolt 51 to be fitted in the positioning notch 223 of the combining plate 22. The stepped bolt 51 has its front end fitted with an elastic member 52 and its rear end fastened by an E-shaped clasp 53 for positioning the quickly detachable device 50 on the basic body 251. Furthermore, the basic body 251 of the protective cover 25 is disposed at the inner side with two positioning blocks 254 corresponding to the quickly detachable device 50.

Figure 7:
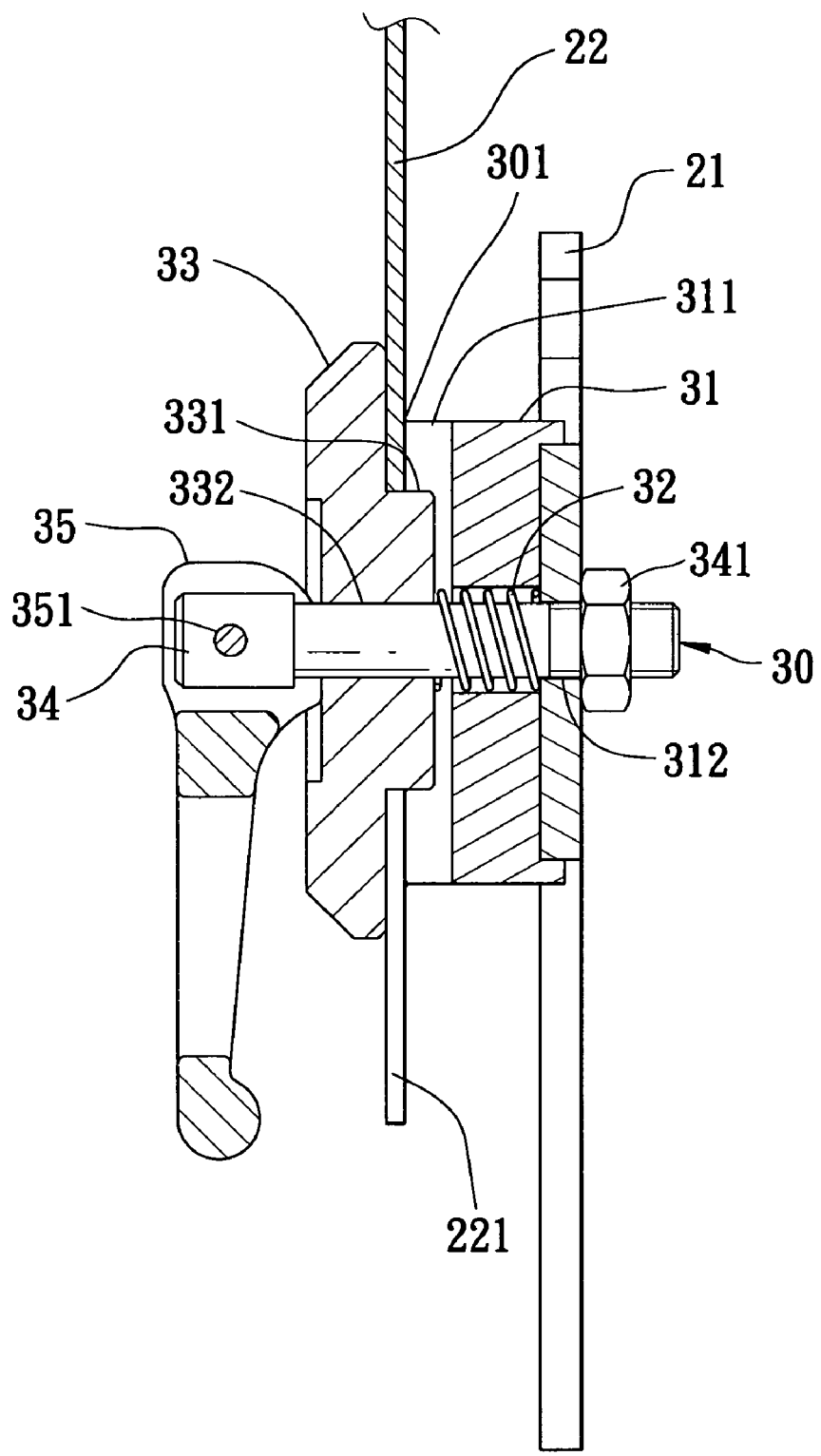
FIG. 7 is a cross-sectional view of the quickly-detachable handle unit of an extending plate in a locked condition in the present invention.

To assemble the protective cover unit on the table sawing machine, as shown in FIGS. 3 and 7, firstly, the combining plate 22 has its elongate notch 221 inserted in the insert space 301 between the fixing base 31 and the position-limiting plate 33 of the quickly-detachable handle unit 30 at the inner end of the extending plate 21 and mounted on the projecting block 331 of the position-limiting plate 33, and then the rotary handle 35 is turned and pressed downward. At this time, by the eccentric action of the eccentric holes 351 of the rotary handle 35, the position-limiting plate 33 is pressed by the rotary handle 35 to move close to the fixing base 31 to diminish the insert space 301 between the position-limiting plate 33 and the fixing base 31 for firmly clamping the combining plate 22 therebetween. Subsequently, hook the round hole 233 of the protective plate 23 with a finger to lift up the protective plate 23 and have its central elongate slot 232 passing through the saw blade 12 and the combining plate 22 and then position the protective plate 23 on the lugs 111 of the oval groove 11 of the work table 10. Simultaneously, the elastic positioning projections 231 at the peripheral edge of the protective plate 23 will function to push against the inner peripheral edge of the oval groove 11 and fix the protective plate 23 on the oval groove 11.

Figure 6:
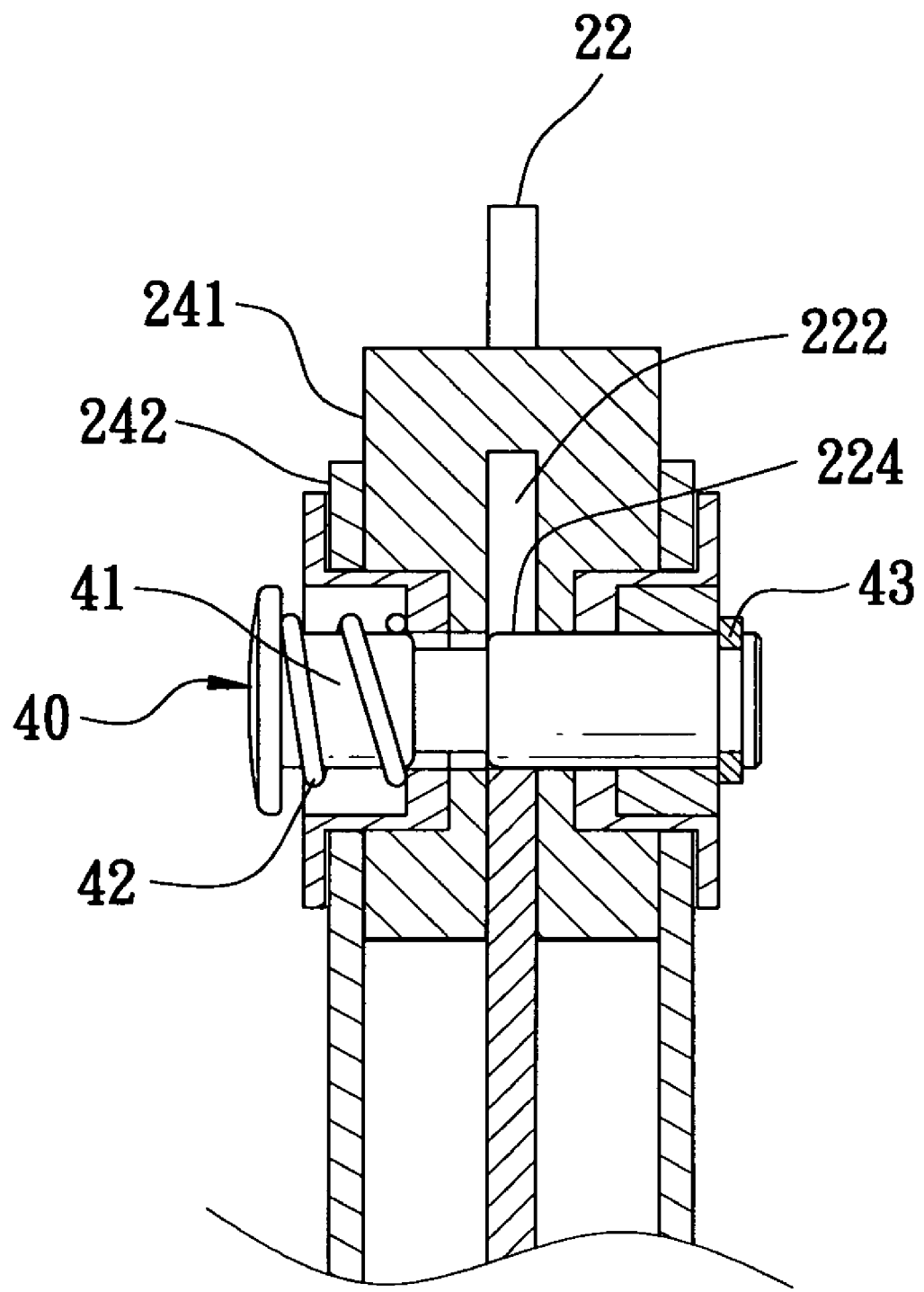
FIG. 6 is a cross-sectional view of the quickly detachable device of a non-return plate in the present invention.

To assemble the non-return plate 24 on the combining plate 22, as shown in FIG. 6, firstly, the quickly detachable device 40 is pressed to let the smaller-diameter column of the stepped bolt 41 inserted through the positioning notch 222 of the combining plate 22. After the quickly detachable device 40 is moved in the positioning hole 224 at the lower end of the positioning slot 222, release the quickly detachable device 40 to let the quickly detachable device 40 moved back by the recovering elasticity of the elastic member 42 and make the larger-diameter column of the stepped bolt 41 inserted and positioned in the positioning hole 224 to fix the non-return plate 24 on the combining plate 22.

Figure 4:
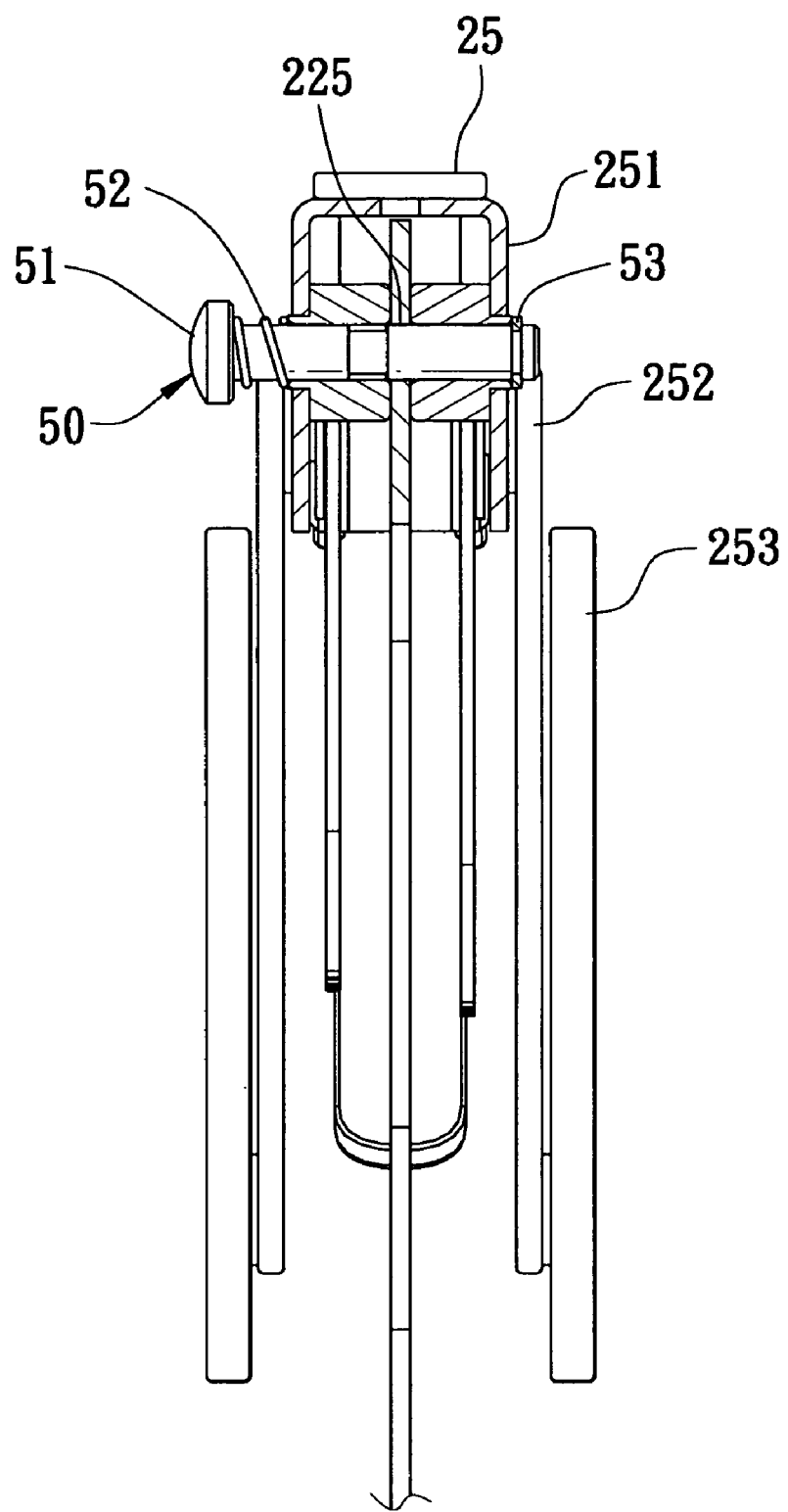
FIG. 4 is a cross-sectional view of the quickly detachable device of a protective cover in the present invention.

To assemble the protective cover 25 on the combining plate 22, as shown in FIG. 4, the quickly detachable device 50 of the protective cover 25 has its stepped bolt 51 fitted in the positioning hole 225 at the bottom of the positioning notch 223 of the combining plate 22 in the same way as that for assembling the non-return plate 24 on the combining plate 22.

Figure 5:
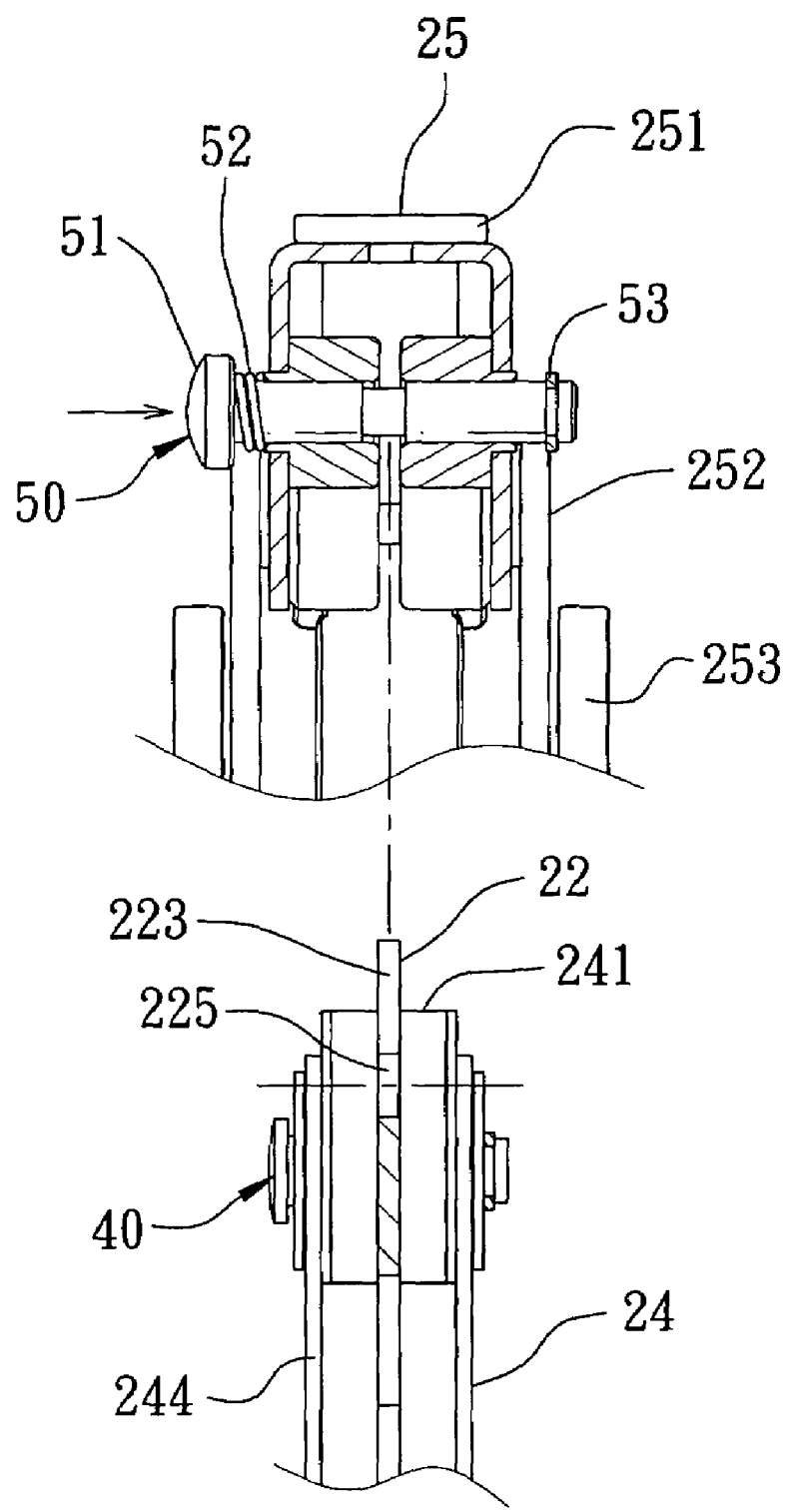
FIG. 5 is a cross-sectional view of the protective cover in a quickly detached condition in the present invention.

To detach the quickly-detachable protective cover unit 20 from the table sawing machine, as shown in FIG. 5, firstly, the quickly detachable device 50 of the protective cover 25 is pressed to let the smaller-diameter column of the stepped bolt 51 not positioned restricted in the positioning hole 225.

At this time, the stepped bolt 51 can be removed out of the positioning notch 223 of the combining plate 22. Next, the non-return plate 24 has the stepped bolt 41 of its quickly detachable device 40 removed out of the positioning notch 222 of the combining plate 22 in the same way as described above. Subsequently, hook the round hole 233 of the protective plate 23 with a finger to lift up the protective plate 23 and remove it from the saw blade 12 and the combining plate 22.

Figure 8:
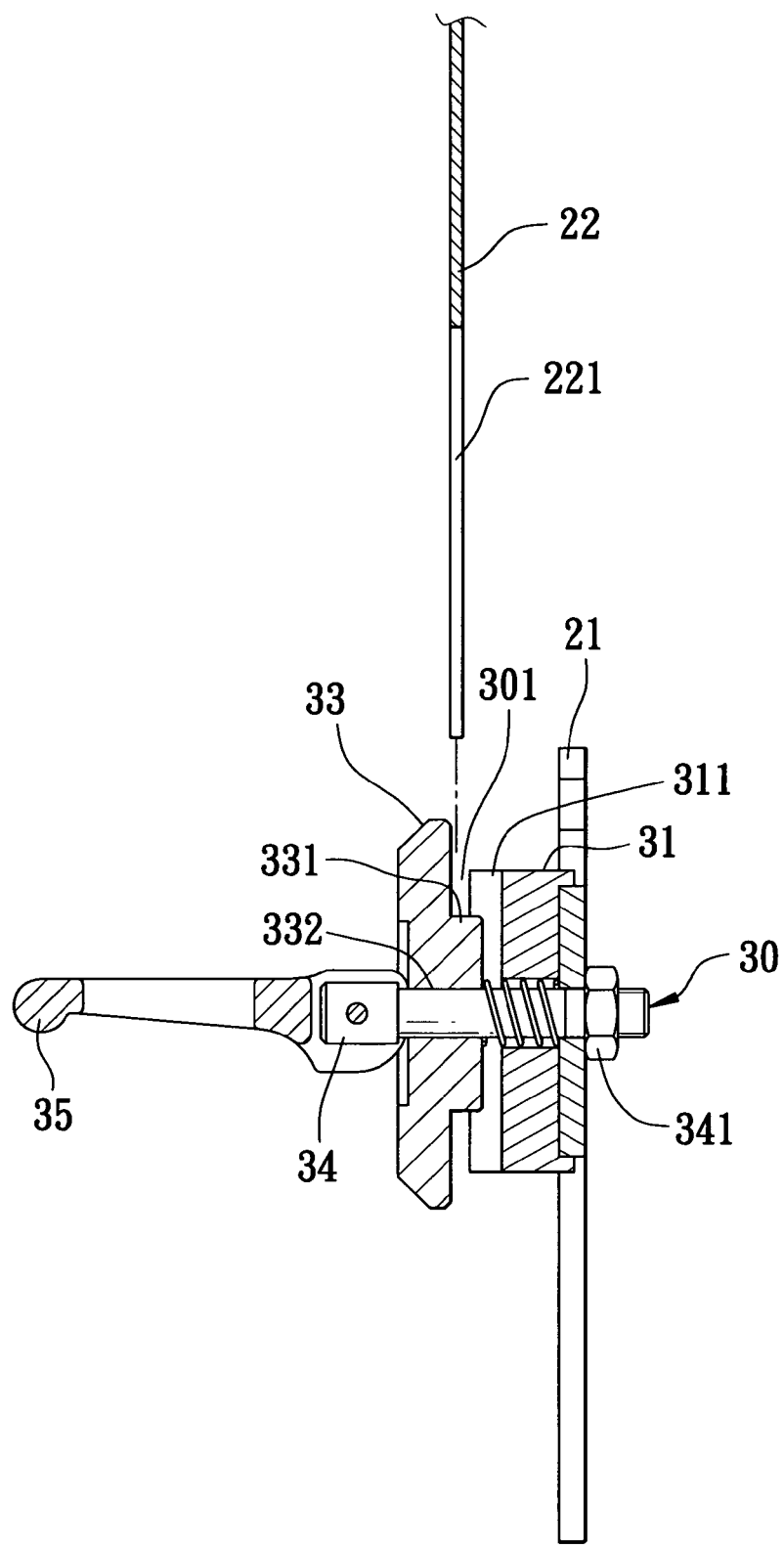
FIG. 8 is a cross-sectional view of the quickly-detachable handle unit of the extending plate in an unlocked condition in the present invention.

To remove the combining plate 22 from the quickly-detachable handle unit 30, as shown in FIGS. 7 and 8, the rotary handle 35 is turned upward to let the elastic member 32 recover its elasticity to push the position-limiting plate 33 away from the fixing base 31 to enlarge the insert space 301 between the position-limiting plate 33 and the fixing base 31. Thus, the combining plate 22 can easily be separated from the quickly detachable handle unit 30.

As can be understood from the above description, the components of the quickly-detachable protective cover unit are fixed in position respectively by the quickly detachable device; therefore, the components of the quickly-detachable protective cover unit can be respectively disassembled or assembled with convenience and with less time as well, needless to employ any tool for carrying out disassembling or assembling work.

While the preferred embodiment of the invention has been described above, it will be recognized and understood that various modifications may be made therein and the appended claims are intended to cover all such modifications that may fall within the spirit and scope of the invention.

I claim:

1. The quickly detachable protective cover unit of a table sawing machine comprising:
    an extending plate fixedly assembled at the outer side of the saw blade of a table sawing machine, said extending plate having its inner end fixed with a quickly-detachable handle unit, said quickly-detachable handle unit having its intermediate portion formed with an insert space adjustable in its width:
    a combining plate having its lower end cut with an elongate notch, said elongate notch of said combining plate fitted in said insert space of quickly-detachable handle unit, said combining plate having its upper edge cut with two positioning notches at preset locations, said two positioning notches having their lower end respectively bored with a positioning hole:
    a protective plate covered around the periphery of said saw blade of said table sawing machine, said protective plate having its peripheral edge pivotally provided with plural elastic positioning projections at preset locations:
    a non-return plate composed of a fundamental base, a front position-limiting member, a rear position-limiting member and two ratchet plates respectively having a lower convex edge formed with many small teeth, said two ratchet plates respectively assembled on the opposite sides of said fundamental base by said front and said rear position-limiting member, said non-return plate having a quickly detachable device pivotally assembled thereon, said quickly detachable device of said non-return plate inserted in one of said two positioning notches of said combining plate: and
    a protective cover composed of a basic body, two connecting rod units and two protective plates, said two connecting rod units respectively and pivotally disposed at a preset location of the opposite sides of said basic body, each said protective plate pivotally connected with one end of said connecting rod unit, said basic body having a quickly detachable device pivotally positioned at one end, said quickly detachable device inserted in the other of said two positioning notches of said combining plate.

2. The quickly-detachable protective cover unit of a table sawing machine as claimed in claim 1, wherein said quickly-detachable handle unit is composed of a fixing base, a position-limiting plate and a quickly detachable pivot, said fixing base cut with a recessed groove having a receiving slot bored therein for receiving an elastic member, said position-limiting plate positioned at one side of said fixing base, said position-limiting plate provided with a projecting block fitting in said recessed groove of said fixing base, said position-limiting plate further bored with a through hole having a comparatively small diameter and aligned to said receiving slot of said fixing base, said quickly detachable pivot inserted through both said fixing base and said position-limiting plate, said quickly detachable pivot having its front end pivotally connected with a rotary handle, said rotary handle bored with eccentric holes pivotally combined with said quickly detachable pivot, said quickly detachable pivot having its rear end screwed with a locking nut, an insert space formed adjustable in its width between said position-limiting plate and said fixing base.

3. The quickly detachable protective cover unit of a table sawing machine as claimed in claim 1, wherein said quickly detachable device of said non-return plate is composed of a bolt and an elastic member fitted on the front end of said bolt, said bolt having its central portion formed with a stepped column, said bolt having its rear end fastened on said non-return plate by an E-shaped clasp.

4. The quickly-detachable protective cover unit of a table sawing machine as claimed in claim 1, wherein said quickly detachable device of said protective cover is composed of a bolt and an elastic member fitted on the front end of said bolt, said bolt having its central portion formed with a stepped column, said bolt having its rear end fastened on said basic body of said protective cover, said basic body provided in the interior with two positioning blocks for matching with said quickly detachable device.

5. The quickly-detachable protective cover unit of a table sawing machine as claimed in claim 1, wherein said work table has an oval recessed groove located around a periphery of the saw blade, and said protective plate is an oval plate having the same shape as that of said oval recessed groove, said protective plate lengthwise bored with an elongate slot for said saw blade to be inserted therethrough, said protective plate further bored with a round hole at a preset location for a finger to be inserted therein for holding and lifting up said protective plate.

* * * * *